(12) United States Patent
Beygi et al.

(10) Patent No.: US 11,661,211 B2
(45) Date of Patent: May 30, 2023

(54) SYSTEMS AND METHODS FOR PROCESSOR MODULE FAILURE ASSESSMENT

(71) Applicant: The Boeing Company, Chicago, IL (US)

(72) Inventors: Shervin Beygi, Seattle, WA (US); Catherine M. Crandall, Renton, WA (US); Omid B. Nakhjavani, Kirkland, WA (US); Andrey A. Zaikin, Renton, WA (US)

(73) Assignee: The Boeing Company, Chicago, IL (US)

( * ) Notice: Subject to any disclaimer, the term of this patent is extended or adjusted under 35 U.S.C. 154(b) by 713 days.

(21) Appl. No.: 16/706,125

(22) Filed: Dec. 6, 2019

(65) Prior Publication Data

US 2021/0171220 A1  Jun. 10, 2021

(51) Int. Cl.
*B64F 5/60* (2017.01)
*G06Q 10/20* (2023.01)
*G06N 5/04* (2023.01)

(52) U.S. Cl.
CPC ............... *B64F 5/60* (2017.01); *G06N 5/04* (2013.01); *G06Q 10/20* (2013.01)

(58) Field of Classification Search
CPC .............. B64F 5/60; G06N 5/04; G06Q 10/20
See application file for complete search history.

(56) References Cited

U.S. PATENT DOCUMENTS

| | | | |
|---|---|---|---|
| 8,165,968 B2 | 4/2012 | Ramesh et al. | |
| 10,157,507 B2* | 12/2018 | Kumar | G07C 5/0825 |
| 10,163,078 B2 | 12/2018 | Kesler et al. | |
| 10,239,640 B2 | 3/2019 | Ethington et al. | |
| 10,814,883 B1* | 10/2020 | Dixit | B60W 50/02 |
| 2011/0140866 A1* | 6/2011 | Scheid | G07C 5/008 340/10.51 |
| 2018/0129721 A1* | 5/2018 | Apple | G06F 16/258 |

(Continued)

FOREIGN PATENT DOCUMENTS

| | | | | |
|---|---|---|---|---|
| EP | 2492849 A2 * | 8/2012 | | G06K 19/07749 |
| WO | WO 2005006097 A1 * | 1/2005 | | |

OTHER PUBLICATIONS

IEEE 100 The Authoritative Dictionary of IEEE Standards Terms 7th Edition, published 2000, all pages (Year: 2000).*

*Primary Examiner* — Calvin Cheung
(74) *Attorney, Agent, or Firm* — Quinn IP Law (57) ABSTRACT

A method includes receiving a component history for a processor module, the component history including identities of host vehicles in a set of host vehicles in which the processor module was installed; receiving an operational history for the set of host vehicles for a time period the processor module was installed on the set of host vehicles; receiving indirect sensor measurements related to the set of host vehicles for the time period; receiving a part survival model that is based at least in part on a part status of a plurality of historical processor modules, the plurality of historical processor modules having a historical component history, a historical operational history, and historical indirect sensor measurements; and determining a survival probability of the processor module based at least in part on the component history, the operational history, the indirect sensor measurements, and the part survival model.

20 Claims, 6 Drawing Sheets

(56) References Cited

U.S. PATENT DOCUMENTS

2018/0341794 A1\* 11/2018 Balasubramanian ........................ G06K 7/10366
2019/0087789 A1\* 3/2019 Barkat ............. G06Q 10/06316
2020/0320804 A1\* 10/2020 Davidson ............... G07C 5/008

\* cited by examiner

| | HOST NUMBER | DELIVERY DATE | ROLLOUT DATE | PRO. MOD. SERIAL | PM LOCATION | INST DATE | RMV DATE | PM INSERT SEQ |
|---|---|---|---|---|---|---|---|---|
| 518 | 402 | 09/24/2012 | 12/17/2010 | 420 | 422-R | 12/17/2010 | 05/13/2013 | 1 |
| 520 | 404 | 09/03/2012 | 07/02/2012 | 420 | 422-L | 05/13/2014 | 07/13/2014 | 2 |
| 522 | 402 | 09/24/2012 | 12/17/2010 | 420 | 422-R | 10/24/2014 | | 3 |

SYSTEMS AND METHODS FOR PROCESSOR MODULE FAILURE ASSESSMENT

FIELD

The present disclosure generally relates to systems and methods for assessing failure of processor modules.

BACKGROUND

Various systems and methods are used to predict and assess a potential failure of processor modules based on direct sensor measurements. For example, a system with a processor module and a temperature sensor configured to measure a temperature of the processor module may be able to assess and predict the likelihood of failure based on the direct sensor reading of the processor module temperature. However, not all processor modules include such direct sensor measurements. As such, there is a need for alternate systems and methods for processor module failure assessments.

SUMMARY

In accordance with one aspect of the present disclosure is a method that includes receiving a component history for a processor module, the component history including identities of host vehicles in a set of host vehicles in which the processor module was installed; receiving an operational history for the set of host vehicles for a time period the processor module was installed on the set of host vehicles; receiving indirect sensor measurements related to the set of host vehicles for the time period; receiving a part survival model that is based at least in part on a part status of a plurality of historical processor modules, the plurality of historical processor modules having a historical component history, a historical operational history, and historical indirect sensor measurements; and determining a survival probability of the processor module based at least in part on the component history, the operational history, the indirect sensor measurements, and the part survival model.

In accordance with another aspect of the present invention, a method includes receiving a component history for processor modules in a plurality of processor modules, the component history comprising host vehicle identities for host vehicles in a set of host vehicles in which the processor modules were installed; receiving an operational history for the set of host vehicles; receiving indirect sensor measurements related to the set of host vehicles; receiving a part status for the plurality of processor modules, the part status indicating whether the processor modules in the plurality of processor modules are in one of an operational status and a failed status; generating a part survival model for the plurality of processor modules based at least in part on the component history, the operational history, the indirect sensor measurements, and the part status; and determining a survival probability for the processor modules in the plurality of processor modules that have the operational status based at least in part on the component history, the operational history, the indirect sensor measurements, and the part survival model.

In yet another embodiment, a system includes a component history module configured to receive a component history for a processor module, the component history comprising an identity of an aircraft in which the processor module was installed; a data processor configured to receive: an operational history for the aircraft for a time period the processor module was installed on the aircraft; and indirect sensor measurements related to the aircraft for the time period; and a processor module survivability module configured to: receive a part survival model that is based at least in part on a part status of a plurality of historical processor modules, each historical processor module having a historical component history, a historical operational history, and historical indirect sensor measurements; and determine a survival probability of the processor module based at least in part on the component history, the operational history, the indirect sensor measurements, and the part survival model.

The features, functions, and advantages that have been discussed can be achieved independently in various embodiments or may be combined in yet other embodiments, further details of which can be seen with reference to the following description and drawings.

The drawings are not necessarily drawn to scale and the disclosed embodiments may be, at least in part, illustrated schematically. Also, the following detailed description is merely exemplary in nature and is not intended to limit the invention or the application and uses thereof. Hence, although the present disclosure is, for convenience of explanation, depicted and described with regard to certain illustrative embodiments, it will be appreciated that the disclosure can be implemented in various other embodiments and in various other systems and environments.

DETAILED DESCRIPTION

Figure 1:
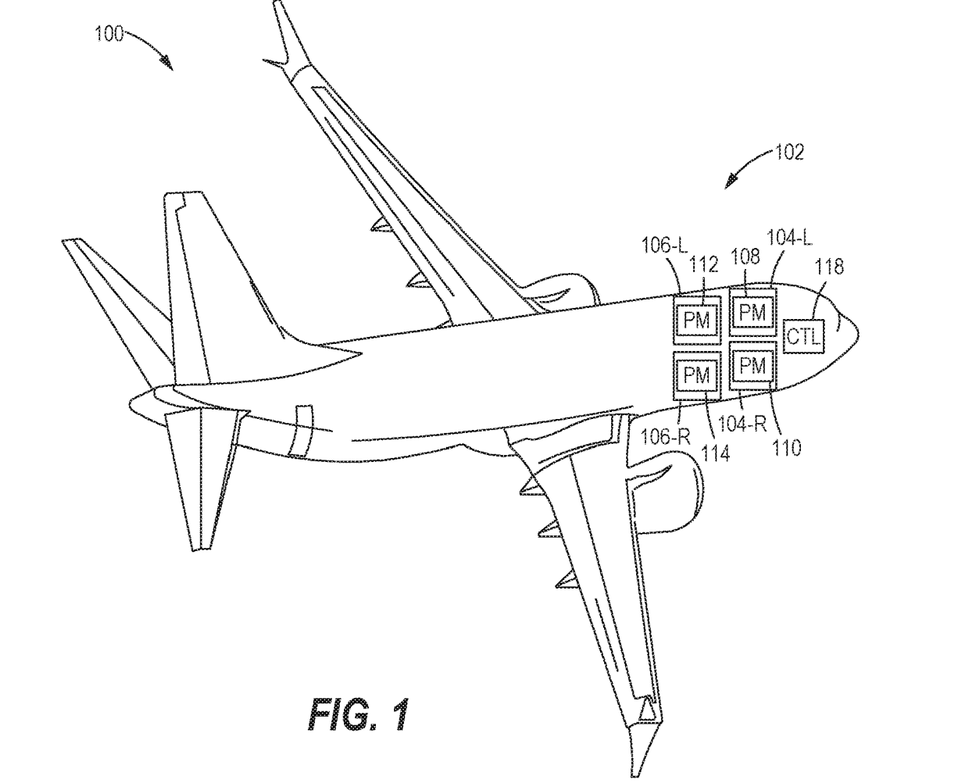
FIG. 1 is a perspective view of a host vehicle, in accordance with the present disclosure.

Referring now to the drawings, and with specific reference to FIG. 1, a host vehicle is shown. In particular, FIG. 1 depicts a perspective view 100 of the host vehicle 102, represented as an aircraft. Although the host vehicle 102 is depicted as an aircraft, it is by way of example and the teachings of this disclosure envision other host vehicles, such as vessels, submersibles, mining equipment, road vehicles, and the like.

The host vehicle 102 includes the installation locations 104-L, 104-R, 106-L, and 106-R. The installation locations throughout the host vehicle 102 are configured to receive a processor module. As depicted in FIG. 1, the processor module (PM) 108 is installed into the installation location 104-L, the processor module (PM) 110 is installed into the installation location 104-R, the processor module (PM) 112 is installed into the installation location 106-L, and the processor module (PM) 114 is installed into the installation location 106-R.

The various installation locations may each correspond to performing a different task. For example, with the host vehicle 102 being an aircraft, the installation location 104-L may receive the processor module 108 that is configured to process data related to flight avionics, the installation location 104-R may receive the processor module 110 that is configured to process data related to operations of radar and communications equipment, the installation location 106-L may receive the processor module 112 that is configured to process data related to an interior climate control of the host vehicle 102, and the installation location 106-R may be a spare installation location with the processor module 114 not being configured to perform any specific operations.

Although four installation locations are depicted and described on the host vehicle 102, any number of installation locations may be included and the various processor modules may be configured to perform tasks related to type of host vehicle 102. Further, the installation locations may be suited to perform different tasks than those discussed in the above example. In some embodiments, the same-positioned installation location across multiple different host vehicles is associated with receiving a processor module that is configured to perform the same set of functions.

The processor modules disclosed herein may be any type of processor modules that are capable of being configured to process data related to performing tasks on the host vehicle 102. When installed into a respective installation location, it is able to receive data and signals, process this received information, and output data and signals based on the processed information. For example, the processor module 108, when configured and installed into the installation location 104-L, may be able to receive control signals produced when a pilot interacts with a user interface within the control station of the host vehicle 102. The processor module 108 may further receive environmental data related to the host vehicle 102, such as engine power or outside air speed. The processor module 108 then processes the data and provides an output. Such an output may be a control signal to change the positions of the control surfaces for the host vehicle 102, change the power of an engine associated with the host vehicle 102, and cause an indication to be displayed to the pilot in the control station.

The processor module 108, upon proper configuration, may be interchangeable with any of the processor modules 110-114 on the host vehicle 102. Thus, it is envisioned that the processor module 108 may be removed from the installation location 104-L, configured to process data related to operations of radar and communications, and then be installed into the installation location 106-L to operate the radar and communications systems of the host vehicle 102.

In some embodiments, the processor modules 108-114 each include a serial number that is unique compared to the other processor modules. The serial number may then be used to identify one processor module from another processor module.

In other embodiments, the processor modules 108-114 do not include a processor-module temperature monitoring device via a direct sensor measurement. These processor modules 108-114 do not include a means to measure the operational temperature of the processor module. As such, these processor modules 108-114 may lack an indicator for use in determining an operational lifespan of the associated processor module.

The host vehicle 102 further includes a controller (CTL) 118. The controller 118 is configured to receive, store, and output any operational data associated with the host vehicle 102. The term 'flight log data' may be used interchangeably with the operational data associated with the host vehicle in an embodiment with the host vehicle 102 being an aircraft. For one example of this operational data, the host vehicle 102 may be equipped with an air speed sensor configured to determine the speed of air flow within the host vehicle 102. The air speed sensor provides, to the controller 118, the air speed data associated with the host vehicle 102, and the controller 118 stores the air speed data within data storage of the controller 118. The controller 118 may then output the stored air speed data continually, or at a later point. This operational data may be used to generate the operational history of the host vehicle 102. Various part survival models may be based at least in part on this operational history data. Other examples include temperature measurements taken by temperature sensors on the host vehicle 102, humidity measurements, operating parameters of the host vehicle 102, and the like.

Figure 2:
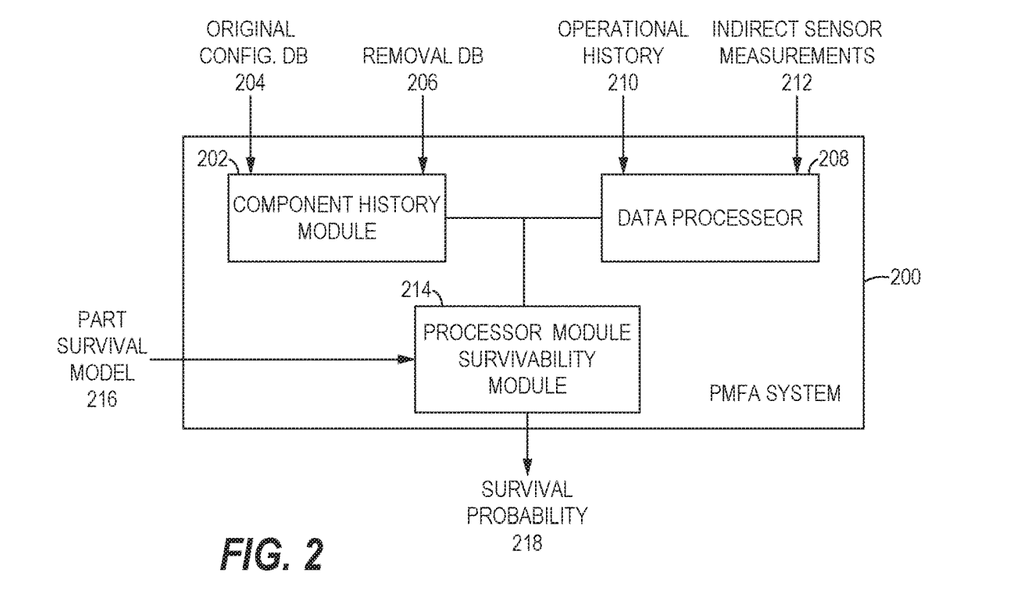
FIG. 2 is a block diagram of a processor module failure assessment (PMFA) system, in accordance with the present disclosure.

FIG. 2 is a block diagram of a processor module failure assessment (PMFA) system, in accordance with the present disclosure. In particular, FIG. 2 depicts the PMFA system 200 having a component history module 202, a data processor 208, and a processor module survivability module 214. The component history module 202 is configured to receive a component history for a processor module. The component history includes an identity of a host vehicle 102 (e.g., aircraft) in which the processor module was installed. The component history module 202 may be configured to receive a component history for any one of the processor modules 108-114 depicted in FIG. 1, all of the processor modules 108-114 depicted in FIG. 1, or for processor modules installed across a set of host vehicles.

In some embodiments, the component history module 202 receives component history data from either one or both of an original configuration database 204 and a processor-module installation and removal database 206. The original configuration database 204 includes an identity of a host vehicle and further identities processor modules and their installation locations installed on the respective identified host vehicle. The original configuration database 204 represents the original status of the host vehicle at the time of being newly manufactured. The original status may coincide to a time period when the host vehicle completes initial manufacture, completes initial testing, is transferred from a manufacturer to a customer, or the like.

The processor-module installation and removal database 206 includes an installation and replacement log of all processor modules installed into and removed from the host vehicles after the time period that coincides with the original status. The processor-module installation and removal database 206 may receive data associated with a host vehicle maintenance facility, the owner of the host vehicle or fleet of host vehicles, or the like. For example, when a host vehicle 102 is being serviced at a maintenance facility, one processor module may be removed from a first installation location on the host vehicle, and a second processor module may be configured and installed into the first installation location on the host vehicle. The database may further include a part status of the first processor module. The part status indicates whether or not the processor module is operational, repaired, failed, or the like. For example, if the first processor module has failed (e.g., is no longer in compliance with operational standards and is not to be repaired), the processor-module installation and removal database 206 may include a flag to indicate that the first processor module has a part status of not operational. Additionally, the database may further include information indicating that the first processor module was repaired and maintains an operational status.

In some embodiments, the data processor 208 is configured to receive one or both of an operational history 210 of the host vehicle and indirect sensor measurements 212. The operational history 210 of the host vehicle includes data related to the host vehicle's operations. In the context of the host vehicle 102 being an aircraft, the operational history 210 may include a date and time the aircraft was activated/deactivated, the duration of operation of various systems (e.g., the operation of a climate control system), and the location of the host vehicle 102 (e.g., a departure and arrival location).

The operational history 210 may be obtained from sensors on-board the host vehicle 102, for example by the controller 118. This data may be represented by a flight log for the host vehicles indicating departure and arrival times and locations, and the like. In some embodiments, the operational history 210 comprises an inactive time of the host vehicles in the set of host vehicles during the time period the processor module is installed on the respective host vehicle. In yet other embodiments, the operational history 210 may comprise a number of operational cycles (e.g., flight cycles) indicating a quantity of cycles of the host vehicles in the set of host vehicles for the time period. Further, the duration of each cycle in the quantity of cycles of the host vehicles may further be included in the operational history 210.

Indirect sensor measurements 212 may be from sensors associated with the host vehicle 102, and indicate the data readings in the vicinity of the host vehicle 102. These indirect sensor measurements 212 are indirect from the processor module and would, for example, not include a direct temperature measurement from the processor module. In the context of the host vehicle 102 being an aircraft, the indirect sensor measurements may include an air speed or flow rate within the host vehicle 102, a speed over the ground, a ground temperature, an ambient temperature, a humidity measurement, an altitude, the percent of an operational capacity the engines are operating, and the like. The temperature and humidity measurements may be from sensors on the host vehicle 102 or be obtained from a separate weather database. When obtaining the indirect sensor measurements 212 from a separate source, the time and location of the host vehicle may be used to query the separate database for the measurements related to the host vehicle 102 for the time that the host vehicle 102 is the location.

The data (204, 206) received by the component history module 202 and the data (210, 212) received by the data processor 208 may be received in real time, may be pulled by an Application Programming Interface (API), may be manually input by an operator, or the like. In some embodiments, data from multiple sources may be merged to obtain the data used in determining the part survival model 216 and a survival probability 218. For example, geographic location data of the host vehicle 102 may be merged with weather data from a forecasting service for the geographic location of the host vehicle 102. In such an example, a host vehicle 102 provides geographic location data to the data processor 208, and the data processor 208 looks up/queries related weather information for the geographic location at the time period from a weather database.

The processor module survivability module 214 receives the component history data from the component history module 202 and the operational history data and indirect sensor measurements from the data processor 208. The processor module survivability module 214 further receives a part survival model 216. The part survival model is based at least in part on a part status of a plurality of historical processor modules, the plurality of historical processor modules having a historical component history, a historical operational history, and historical indirect sensor measurements. In some embodiments described herein, receiving the part survival model comprises generating the part survival model.

Based on the received component history (e.g., 202 and 204), the operational history 210, the indirect sensor measurements 212, and the part survival model 216, the processor module survivability module 214 determines a survival probability of the processor module. This survival probability indicates a likelihood of survival of the processor module over a second time period. This likelihood of survival may be based on an assumed future operational schedule of the processor module or may be based on an actual operational schedule of the host vehicle on which the processor module is installed. The likelihood of survival may be expressed as a likelihood of failure over a given time period, a future time period the survival probability is expected to exceed a threshold value, and the like. The survival probability may then be output, used to order replacement processor modules, schedule replacement of the processor module, and the like.

The historical data that the part survival model is based on may represent the data (204, 206, 210, 212) obtained over a prior time period. Such data may be referred to as variable inputs to the part survival model herein. For example, the historical data may represent all previously obtained data that is associated with processor modules of the same make and model as the current processor modules installed within the host vehicles. The part survival model 216 may be determined periodically.

In other embodiments, receiving the part survival model 216 comprises generating the part survival model 216. The part survival model 216 may be generated by the processor module survivability module 214 itself or another external processor. The part survival model may be based in part on a cumulative Cox Proportional Hazard model that assesses a weight of the variable inputs. Further, the part survival model 216 may be based on machine learning and statistical analysis to analyze the variable inputs to select proper weighting to the various different variable inputs.

Figure 3:
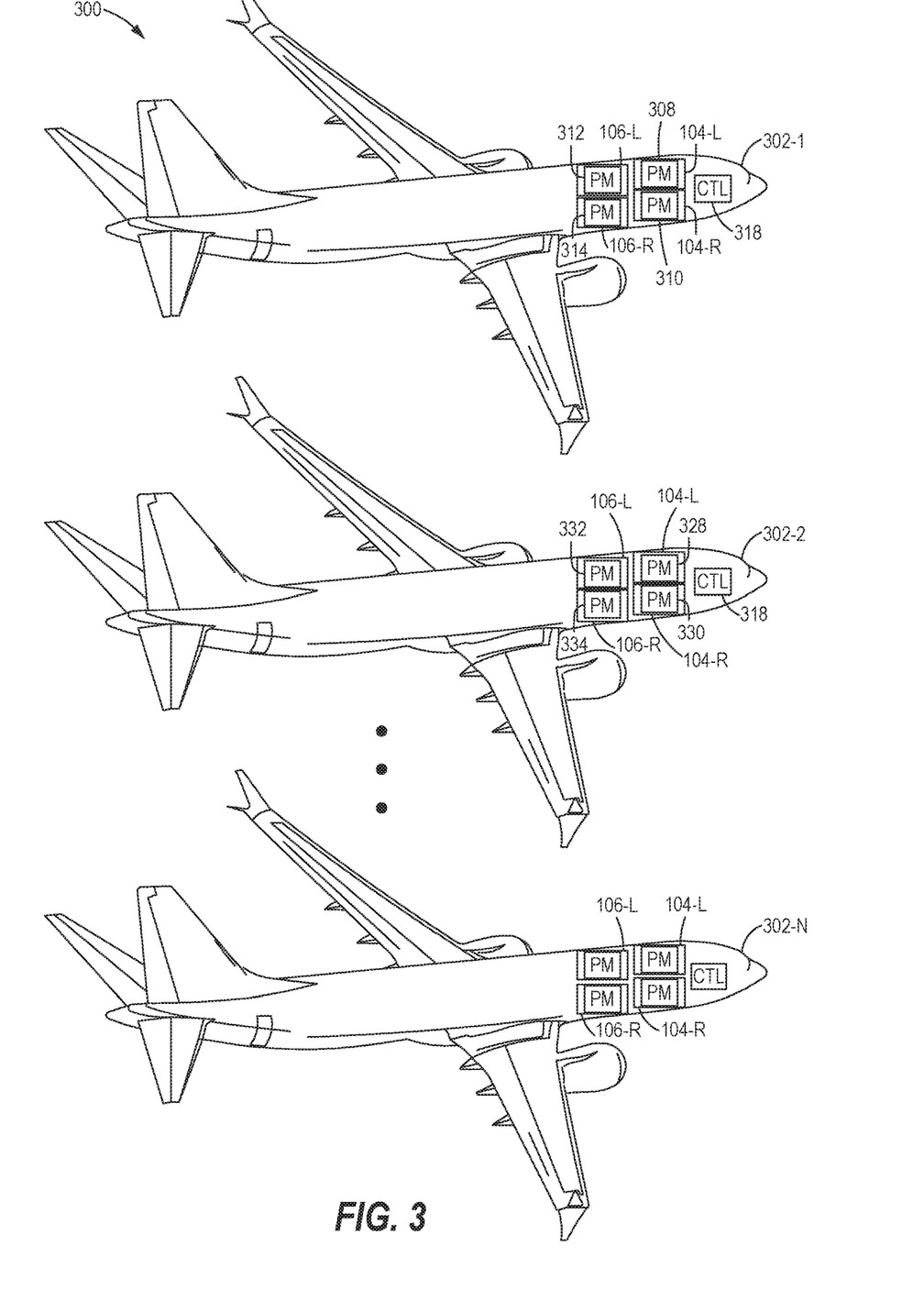
FIG. 3 depicts a plurality of host vehicles, in accordance with the present disclosure.

FIG. 3 depicts a plurality of host vehicles, in accordance with the present disclosure. In particular, FIG. 3 depicts the view 300 of a fleet of host vehicles having the host vehicles 302-1, 302-2, and 302-N. Here, the host vehicles 302-1 to 302-N are similar to that of the host vehicle 102 described in FIG. 1, with like-numbered components serving the same functions. The host vehicles 302 in the fleet may all be associated with a common owner (e.g., an airline), or may represent all host vehicles of the same model produced by a manufacturer.

The host vehicle 302-1 includes the controller (CTL) 318, and the installation locations 104-L, 104-R, 106-L, and 106-R that are configured to perform the same functions as the installation locations discussed in conjunction with FIG. 1. On the host vehicle 302-1, the processor module (PM) 308 is installed into the installation location 104-L, the processor module (PM) 310 is installed into the installation location 104-R, the processor module (PM) 312 is installed into the installation location 106-L, and the processor module (PM) 314 is installed into the installation location 106-R. Similarly, host vehicle 302-2 includes the processor modules (PM) 328, 330, 332, and 334 installed into the installation locations as depicted in the view 300 of FIG. 3. The host vehicles 302-N represent any number of host vehicles in the fleet of host vehicles. These host vehicles 302-N may be similarly configured as the host vehicles 302-1 and 302-2 and include different identified processor modules installed within their installation locations. Component history data, operational history data, and indirect sensor measurements may be obtained and provided to the processor module survivability module 214 for each of the different host vehicles 302 in the fleet of host vehicles. This data may be used to generate a part survival model or to determine a survival probability for the operational processor modules within the fleet.

Figure 4:
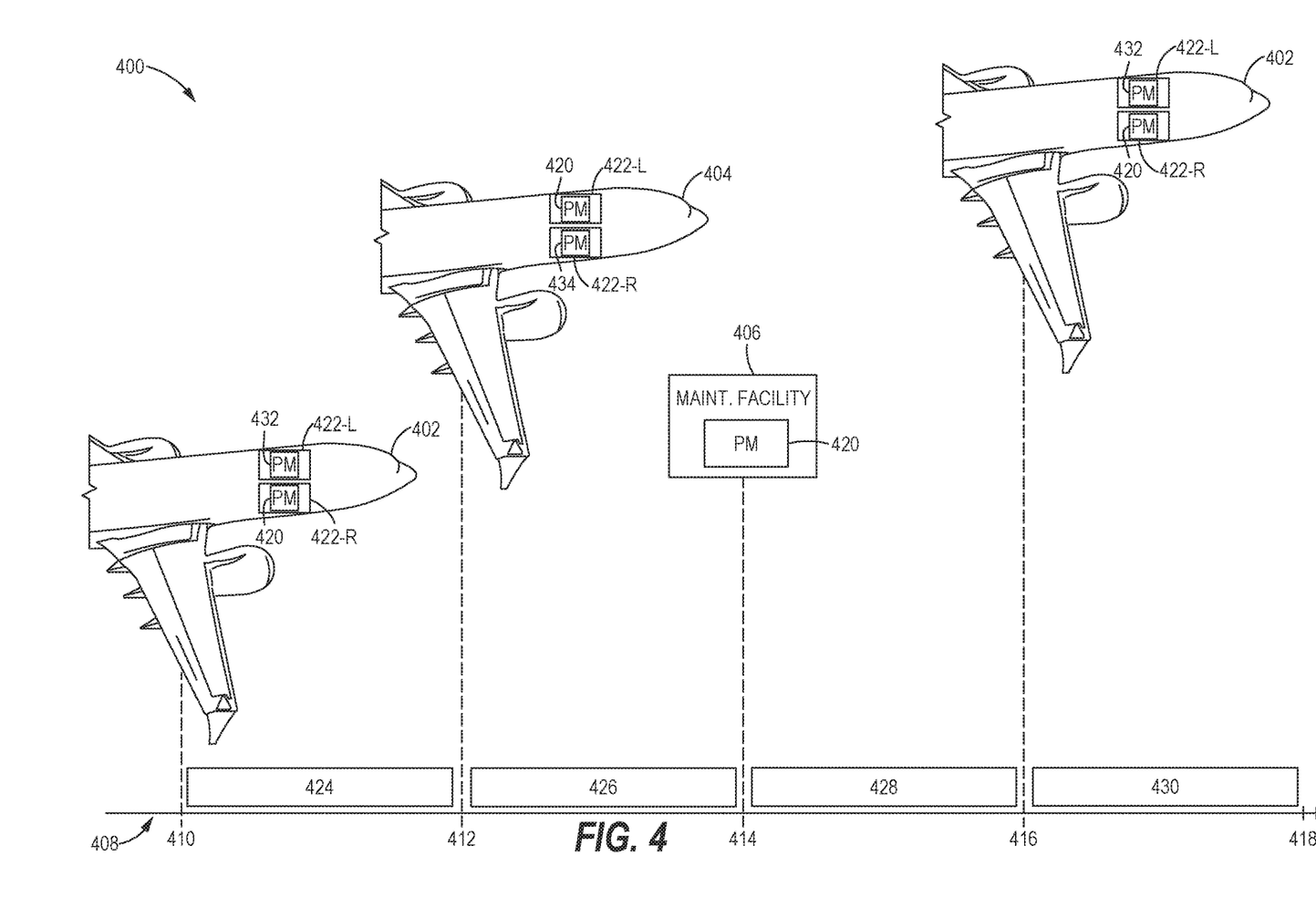
FIG. 4 is a timeline associated with a processor module, in accordance with the present disclosure.

FIG. 4 is a timeline associated with a processor module, in accordance with the present disclosure. In particular, FIG. 4 depicts the timeline 400 showing the locations of the processor module (PM) 420 as it is installed into various installation locations 422 among the various host vehicles 402 and 404 and the maintenance facility 406.

The timeline axis 408 includes five successive points in times across four time periods. The first time period 424 is bounded by the first point in time 410 and the second point in time 412, the second time period 426 is bounded by the second point in time 412 and the third point in time 414, the third time period 428 is bounded between the third point in time 414 and the fourth point in time 416, and the fifth time period is bounded by the fourth point in time 416 and the fifth point in time 418.

During the first time period 424, the processor module 420 is installed into the installation location 422-R on the host vehicle 402. During the second time period 426, the processor module 420 has been moved to the host vehicle 404 and is now installed into the installation location 422-L. During the third time period 428, the processor module 420 is at the maintenance facility 406. During the fourth time period 430, the processor module 420 is returned to the installation location 422-R on the host vehicle 402, the host vehicle it was installed on during the first time period 424. Although not discussed in detail herein, the processor modules 432 and 434 are also installed into various installation locations 422 on the host vehicles 402 and 404 as depicted in the timeline 400. The timeline 400 may not depict a complete timeline for the processor modules 432 and 434 as it is feasible that these processor modules may be installed within other installation locations on other host vehicles at other time periods than those depicting the timeline 400 for the processor module 420.

Although only two installation locations 422 are depicted in the timeline 400, it is envisioned that a host vehicle may include more or less installation locations for which the processor modules may be installed within. Similar to the installation locations 104, 106 of FIG. 1, the installation locations 422-R, 422-L may each be associated with performing specific tasks within the host vehicles 402, 404. The host vehicles 402 and 404 may represent two of the host vehicles 302 from the set of host vehicles depicted in FIG. 3.

Referring back to FIG. 2 along with the current discussion of FIG. 4, the processor module 420 is installed on the host vehicle 402 during the first time period 424 and the fourth time period 430. Thus, when receiving the operational history 210 for the host vehicle in which the processor module was installed, the operational history associated with the host vehicle 402 during the first time period 424 and the fourth time period 430 are provided to the data processor 208. Further, the operational history associated with the host vehicle 404 during the second time period 426 is provided to the data processor 208.

Figure 5:
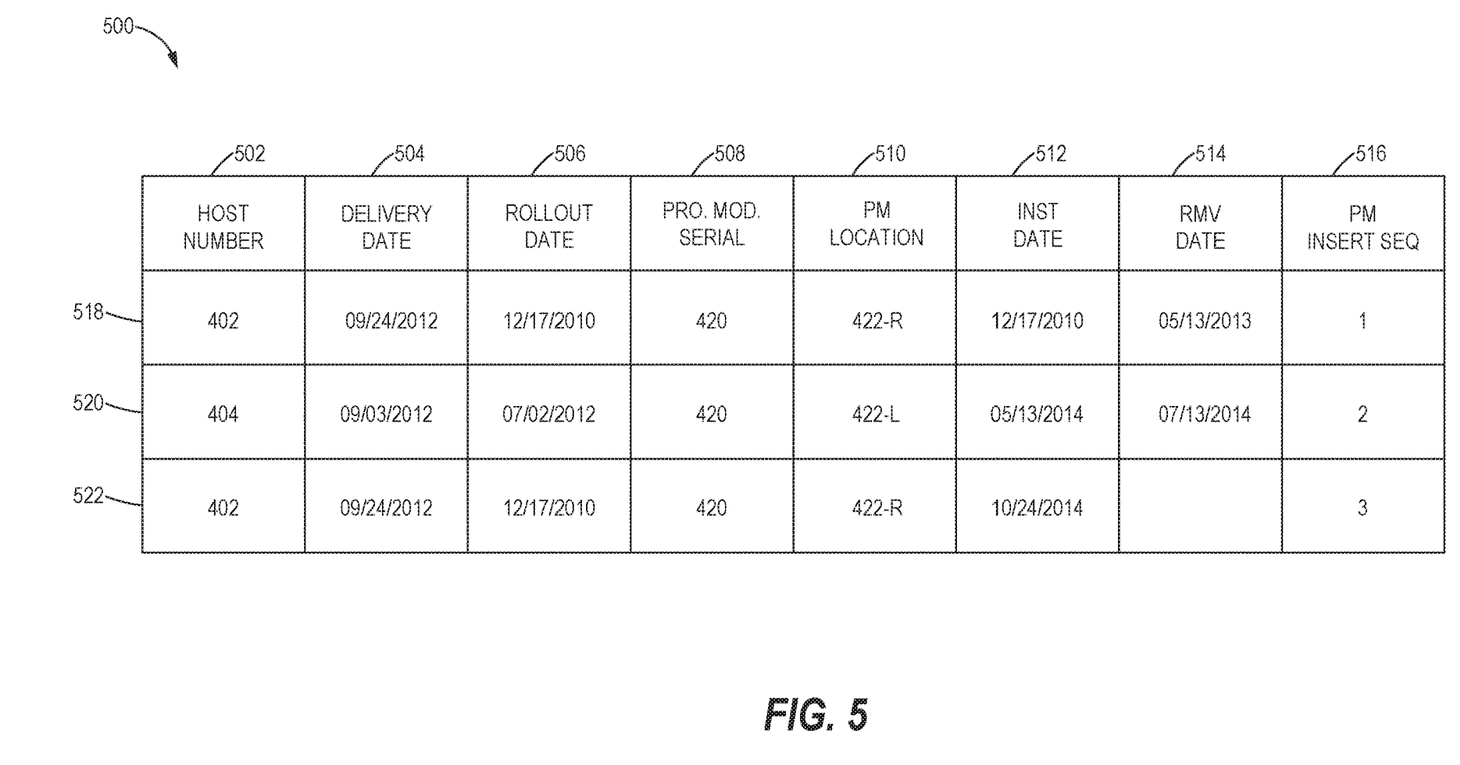
FIG. 5 is a chart depicting a component history, in accordance with the present disclosure.

FIG. 5 is a chart depicting a component history, in accordance with the present disclosure. In particular, FIG. 5 depicts the chart 500 that includes columns for a host number 502, a delivery date 504, a rollout date 506, a processor module serial number 508, a processor module installation location 510, an installation (INST) date 512, a removal (RMV) date 514, and a processor module insertion (INSERT) sequence 516. The data within the row 518 is associated with the first time period 424, the data within the row 520 is associated with the second time period 426, and the data within the row 522 is associated with the fourth time period 430 from the FIG. 4.

The chart 500 having the component history for the processor module 420 may further include component history information for other processor modules, such as the processor modules 432 and 434 of FIG. 4, although this is not depicted in the chart 500 for clarity. In the chart 500, the host number 502 identifies the host vehicle that the respective processor module is installed. Here, the processor module 420 is installed within the host vehicle 402 in the rows 518 and 522, associated with the first time period 424 and the fourth time period 430 of FIG. 4, respectively. The processor module 420 is also shown as being installed in the host vehicle 404 in the row 520, associated with the second time period 426.

The delivery date 504 represents a point in time when the host vehicle was delivered to a customer. The rollout date 506 indicates when the host vehicle became operational. The time between the rollout date and the delivery data may include operational testing of the host vehicle, and any operational history associated with the host vehicle may be included when determining the part survival model and the survival probability of the processor modules. Here, the processor module serial number 508 is used to identify the processor module. In the chart 500, the reference identifier '420' used throughout this detailed description is used for the serial number of the processor module, although an actual serial number of the processor module may be used in practice.

The processor module installation location 510 indicates which installation location the processor module is installed within each host vehicle. Coinciding with the timeline 400 of FIG. 4, the processor module 420 was installed within the installation location 422-R during the first time period 424, the installation location 422-L during the second time period 426, and the installation location 422-R during the fourth time period 430.

The installation date 512 and the removal date 514 indicate a date that the respective processor module was installed and removed from the installation location on the host vehicle. In the row 518, the installation date 512 coincides with the rollout date 506 for the host vehicle 402. Although the processor module 420 may have been installed into the installation location 422-R on the host vehicle 402 before the date of '12/17/2010,' it is not expected that the processor module 420 has been operated in a manner to affect the part survival model or the survival probability associated with the processor module. Use of the rollout date 506 for the start of the first time period 424 depicts utilization of the original host vehicle configuration (e.g., ORIGINAL CONFIG. DB 204) as a part of the component history. The remainder of the component history may be supplemented by a part installation and removal database (e.g., REMOVAL DB 206) indicating when and where processor modules are installed within various installation locations among various host vehicles.

The installation date 512 and removal date 514 columns may be used to assign dates to the points in time of FIG. 4. Here, the first point in time 410 may be the rollout date of Dec. 17, 2010. The second point in time 412 is the date May 13, 2013, or the date the processor module 420 was removed from the host vehicle 402 according to the data within row 518. Further, the processor module 420 was also installed within the host vehicle 404 on the same day it was removed from the host vehicle 402, although there may be a temporal gap between removal and installation of the processor modules. The third point in time 414 is the date Jul. 13, 2014, indicating the time that the processor module 420 was removed from the host vehicle 404 according to the data within the row 520. The fourth point in time 416 is the date Oct. 24, 2014, the date that the processor module 420 was installed within the host vehicle 402 according to the data within the row 522. The fifth point in time 418 may be the present day because there are no further records of the processor module being removed from its host vehicle.

During the third time period 428, the processor module 420 was within the maintenance facility 406. A separate component history may be maintained regarding processor modules within a maintenance facility or this data may be added to the chart 500. The component history from the maintenance facility may include data related to the operational status of the processor modules. For example, the separate component history may indicate whether the processor module was damaged, repaired, no longer operational, failed, or operational.

The data contained within the chart 500 having the component history may be obtained from both internal and external sources. For example, an airline may have maintenance facilities it operates and maintenance facilities it contracts with to repair the host vehicles and associated processor modules. Data from both the self-operated and contracted maintenance facilities may be merged to make one component history for each processor module. In another example, a host vehicle manufacturer may receive external data from multiple different host vehicle end users (e.g., an airline in the context of the host vehicle being an aircraft). The host vehicle manufacturer may consolidate the component history for each processor module across multiple different end users for use in determining the part survival model and the processor module survivability.

INDUSTRIAL APPLICABILITY

The teachings disclosed herein may be applied to various different industrial applications from aircraft, to surface vehicles, to water-going vessels, and the like. Such teachings may be used to determine how long a new processor module will last, determine the performance of a processor module after a repair, and determine the effect of the installation location on a processor module. Further, a maximum number of repair attempts may be determined to help improve the determination of whether or not to repair a processor module or not. Other ways the teachings may be used include evaluating supplier contractual obligations, estimating part repair time by supplier, evaluating part repair improvement over time, and determining part prognostics by joining with flight leg and report parameters from an onboard aircraft condition monitory system that is configured to record conditions of the aircraft.

By way of example, the teachings disclosed herein may be generic to processor modules on a host vehicle, or more specifically as a processor module installed onto an aircraft.

Figure 6:
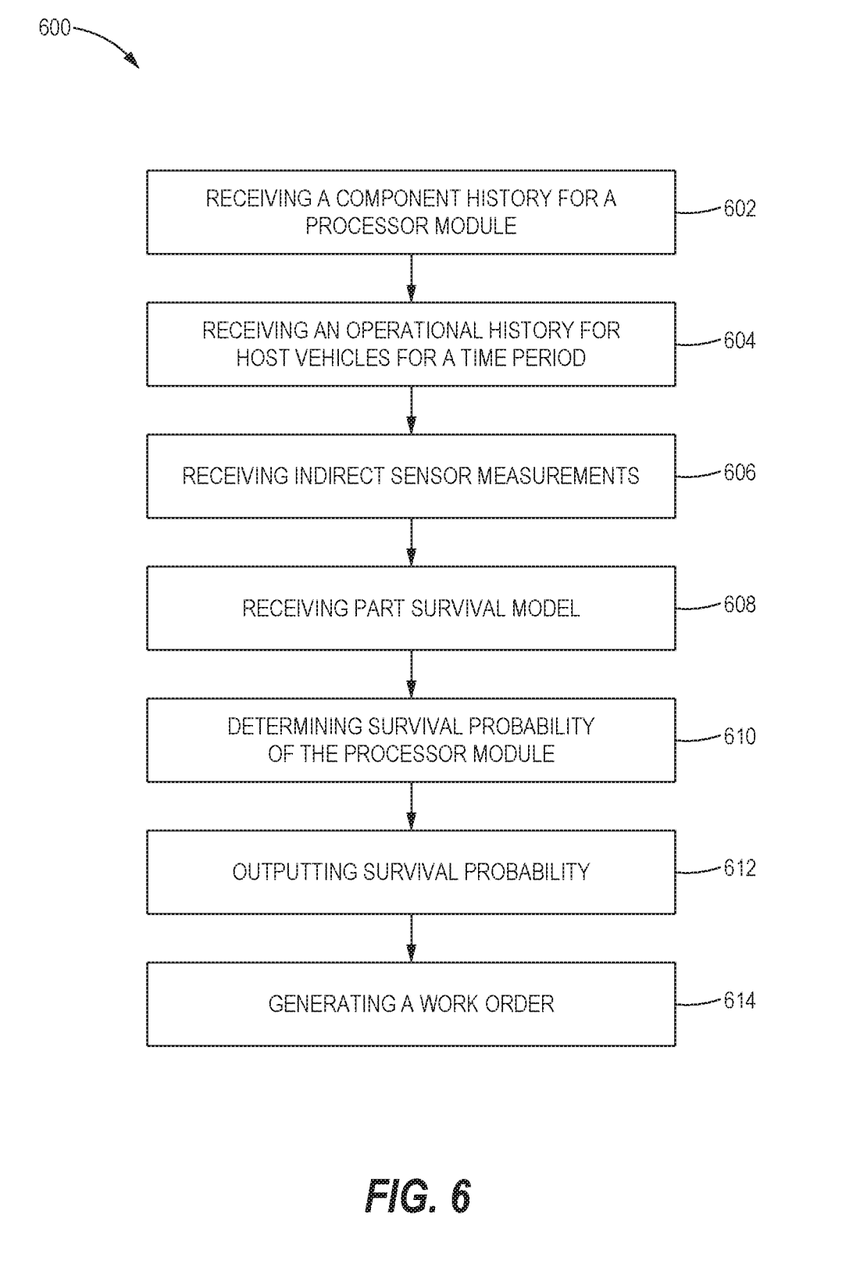
FIG. 6 is a first method, in accordance with a method of the present disclosure.
Figure 7:
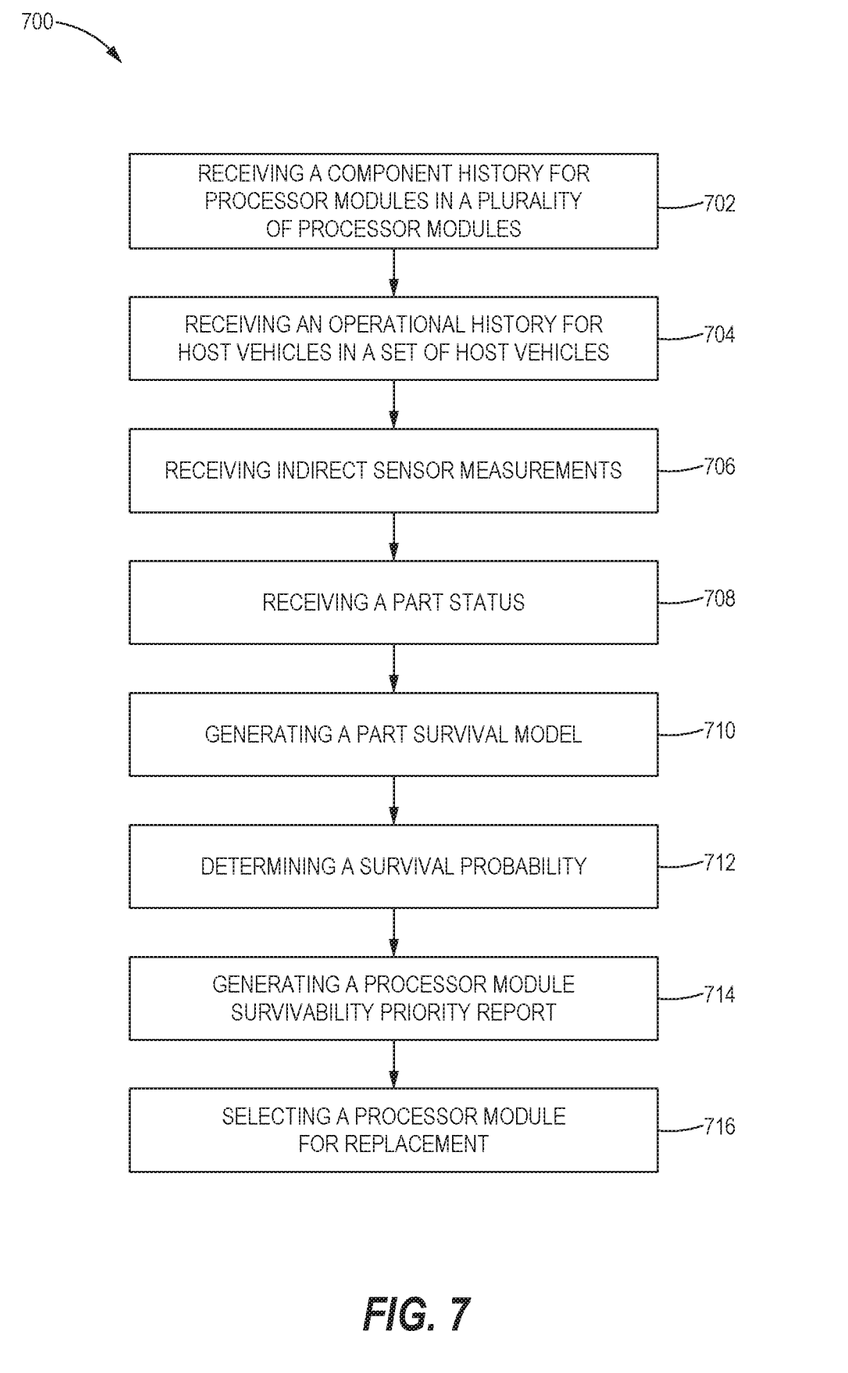
FIG. 7 is a second method, in accordance with another method of the present disclosure.

The disclosures of FIGS. 1-5 will be used in conjunction with the teachings of the methods depicted in the FIGS. 6 and 7.

FIG. 6 is a first method, in accordance with a method of the present disclosure. In particular, FIG. 6 depicts a method 600 that includes receiving a component history for a processor module at block 602, receiving an operational history for host vehicles for a time period at block 604, receiving indirect sensor measurements at block 606, receiving a part survival model at block 608, determining a survival probability of the processor module at block 610, outputting a survival probability at block 612, and generating a work order at block 614.

At block 602, the component history is received for the processor module. In some embodiments, the component history module 202 receives the component history. For example, the component history depicted in the chart 500 of FIG. 5 may be received for the processor module 420. This component history includes an identity of the host vehicles in a set of host vehicles in which the processor module was installed. In some embodiments, the component history further identifies the installation location within the host vehicles in the set of host vehicles the processor module was installed. For example, column of the chart 500 listing host numbers 502 indicates the identities of the host vehicles 402 and 404, which the processor module 420 was installed within. The column for the processor module installation location 510 indicates which installation locations (422-R, 422-L) the processor module 420 was installed.

At block 604, an operational history for the host vehicles for the time period the processor module was installed on the set of host vehicles is received. In some embodiments, the data processor 208 receives the operational history 210. Using the examples disclosed in FIGS. 4 and 5, the operational history for the host vehicle 402 for the first time period 424 and the fourth time period 430 is received along with the operational history for the host vehicle 404 for the second time period 426.

At block 606, indirect sensor measurements related to the set of host vehicles for the time period are received. In some embodiments, the indirect sensor measurements 212 are received by the data processor 208. The indirect sensor measurements 212 may be measured from the host vehicle in which the processor module is installed, or may be from external measurement devices configured to obtain the indirect sensor measurement associated with the host vehicle. For example, the indirect sensor measurements may be an air flow rate or a humidity measurement measured by the host vehicle, or they may be from a weather database that comprises temperature and humidity data at the geographic location of the host vehicle.

At block 608, a part survival model is received. In some embodiments, the part survival model is received from an external source or is generated. The part survival model may be based at least in part on a part status of a plurality of historical processor modules. The part status indicates whether or not a particular one of the historical processor modules is in an operational status or not over a given time period. For each of the historical processor modules, a historical component history, a historical operational history, and historical indirect sensor measurements are provided for. The part survival model is based on this historical data and the part status. In some embodiments, the part survival model is based in part on a cumulative Cox Proportional Hazard model that assesses a weight of variable inputs. The variable inputs are the various aspects of the historical component history, the historical operational history, and the historical indirect sensor measurements. In some embodiments, the operational history and indirect sensor measurements are evaluated for the historical processor modules that have a failed part status to provide for weighting of the different variables in the part survival model.

At block 610, a survival probability of the processor module is determined based at least in part on the component history, the operational history, the indirect sensor measurements, and the part survival model. The survival probability of the processor module indicates a likelihood of survival of the processor module over a subsequent time period. The determination may be based at least in part on comparing the operational history and indirect measurements of the processor module under determination as compared to the weighted variables of the part survival model.

Thus, in the example depicted in FIG. 4, a part survival model may be received that is based on historical data from a time before the first point in time 410. Variable inputs are applied to each of the aspects of the historical data and provided a weighting. The weighting of the variable inputs may be generated by statistical analysis, machine learning, a combination of statistical analysis and machine learning, or the like.

The operational history of the host vehicle 402 (block 604), the operational history of the host vehicle 404 for the time period 426 (block 604), and indirect sensor measurements (block 606) from the time periods 424, 426, and 430, are used as a basis for determining the survival probability of the processor module 420.

In some embodiments, the method further includes outputting the survival probability of the processor module. At block 612, the survival probability of the processor module is output, for example, by the processor module survivability module 214 of FIG. 2. Outputting the survival probability of the processor module may comprise displaying the survival probability on a computer screen, printing the survival probability, electronically transmitting the survival probability, and the like. At block 614, a work order to replace the processor module may be generated. This may be based at least in part on the survival probability for the processor module 420 being below a first threshold value. The first threshold value may correspond to a certain likelihood that the processor module 420 will fail in a given upcoming time period.

FIG. 7 is a second method, in accordance with another method of the present disclosure. In particular, FIG. 7 depicts the method 700 that includes receiving a component history at block 702, receiving an operational history for host vehicles at block 704, receiving indirect sensor measurements at block 706, receiving a part status at block 708, generating a part survival model at block 710, determining a survival probability at block 712, generating a processor module survivability priority report at block 714, and selecting a processor module for replacement at block 716.

The method 700 of FIG. 7 is similar to the method 600 of FIG. 6. However, in the method 700, the component history received at block 702 is for a plurality of processor modules. The component history includes an identity of host vehicles in a set of host vehicles in which the processor modules were and are installed. Using the disclosure of FIGS. 4 and 5, the method 700 may further receive the component history associated with the processor modules 432 and 434. As seen in FIG. 4, the processor module 432 is installed into the host vehicle 402 in installation location 422-L at least during the first time period 424 and during the fourth time period 430. The processor module 434 is installed into the host vehicle 404 at least during the second time period 426.

While FIG. 4 depicts the installation locations of the processor module 420, it is possible that the processor modules 432 and 434 were installed into the respective host vehicles outside of the points in time depicted in the timeline 400. A separate chart 500 may be maintained for each of the different processor modules in the plurality of processor modules. Alternatively, the chart 500 may further include the component history of processor modules other than for just the processor module 420.

The operational history received at block 704 includes operational history for the host vehicles in the set of host vehicles that the plurality of processor modules were installed. Further, the indirect sensor measurements received at block 706 include indirect sensor measurements related to the set of host vehicles.

At block 708, a part status for the plurality of processor modules is received. The part status includes whether the processor modules in the plurality of processor modules are in one of an operational status and a failed status. The method 700 includes a plurality of processor modules installed within a set of host vehicles. As such, some of the processor modules in the set of processor modules may have failed (e.g., are in a failed state) and have been replaced by a new, repaired, or spare processor module to continue operating the set of host vehicles.

At block 710, a part survival model for the plurality of processor modules is generated based at least in part on the component history, the operation history, the indirect sensor measurements, and the part status. In generating a part survival model, a Hazard function may be used to represent the probability that a processor module will fail within the instant given that it has survived up until a certain point in time. This Hazard function may be used to calculate a survival that represents the probability that a processor module will survive past a point in time.

In some embodiments, the Hazard function is a Cox Proportional Hazard model that enables assessment of the importance of various covariates in the survival times of objects. The data related to the operational history and the indirect sensor measurements are used as covariates in the Hazard function in some embodiments. For processor modules installed within an aircraft, the various covariates may include a number of flight cycles, outside temperature, airflow, ground time, part installation location, an identity of an airline that the host vehicles are associated with, and the like. In some embodiments, the interdependency of the covariates may be analyzed. For example, a ground temperature in the vicinity of the host vehicle may affect the survivability of a processor module when the host vehicle 102 is on the ground, and the ground temperature in the vicinity of the host vehicle may not affect the survivability of the processor module when the host vehicle 102, being an aircraft, is flying through the air. Thus, the interdependency of the ground temperature and an altitude of the host vehicle 102 may be combined determine the survivability of the processor module.

The weighting of the covariates may be based on statistical analysis, machine learning, or a combination of statistical analysis and machine learning. One such example of machine learning may include generation of a survival tree. In growing the survival tree, at each node, a random number of candidate covariates are selected. Nodes are split using the candidate covariate that maximizes survival difference between daughter nodes. The survival tree may then be used to calculate a cumulative hazard function for each tree at its terminal node using a Nelson-Aalen estimator.

As more time passes, it is expected that more processor modules in the plurality of processor modules will be in a failed status. The operational history and indirect measurement variables associated with the processor modules in a failed status will be used to generate a part survival model that is applicable to the remaining operational processor modules in the plurality of processor modules.

At block 712, the survival probability for the processor modules in the plurality of processor modules that have the operational status is determined based at least in part on the component history, the operational history, the indirect sensor measurements, and the part survival model.

In some embodiments, the method 700 may include generating an operational processor module survivability report at block 714. This report is based on the survival probability and indicates which processor modules in the plurality of processor modules are least likely to survive during a second subsequent time period. This report may indicate a priority of replacement of processor modules, ranking the processor modules least likely to survive as high-priority processor modules to replace.

The method 700 may further include selecting processor modules in the plurality of processor modules for replacement at block 716. This selection may be based at least in part on the operational processor module survivability report. The selection may incorporate procuring additional processor modules to replace the selected processor modules (e.g., determining a quantity of replacement processor modules). This selection may further comprise generating work orders to facilitate the replacement of the processor modules.

What is claimed is:

1. A method comprising:
    installing a processor module on one of a set of host vehicles;
    receiving a component history for the processor module, the component history including identities of hos vehicles in the set of host vehicles in which the processor module was installed;
    receiving an operation history for the set of host vehicles for a time period the processor module was installed on the set of host vehicles;
    receiving indirect sensor measurement related to the set of host vehicles for the time period;
    receiving a part survival model that is based at least in part on a part status of a plurality of historical processor modules, the plurality of historical processor modules having a historical component history, a historical operation history, and historical indirect sensor measurements;
    determining a survival probability of the processor module based at least in part of the component history, the operational history, the indirect sensor measurement, and the part survival model;
    removing the processor module from the one of the set of host vehicles;
    re-tasking the removed processor module and
    re-installing the re-tasked processor module on one of the host vehicles of the set of the host vehicles.

2. The method of claim 1, wherein the processor module is identified by a serial number.

3. The method of claim 1, wherein the component history is determined in part based on an original host vehicle configuration and a part installation and removal record.

4. The method of claim 1, wherein the component history comprises installation locations within the host vehicles of the set of host vehicles the processor module was installed, and wherein the processor module is installed in one of the installation locations.

5. The method of claim 1, wherein the operational history comprises a quantity of operational cycles indicating a quantity of cycles of the host vehicles of the set of host vehicles for the time period and durations of cycles in the quantity of cycles of the host vehicles.

6. The method of claim 1, wherein the operational history comprises an inactive time of the host vehicles of the set of host vehicles during the time period.

7. The method of claim 1, wherein the indirect sensor measurements comprise at least one of a temperature measurement or a humidity measurement at geographical locations of the set of host vehicles during the time period.

8. The method of claim 1, wherein the indirect sensor measurements comprise an air flow rate of the set of host vehicles during the time period.

9. The method of claim 1, wherein the part survival model is based in part on a cumulative Cox Proportional Hazard model that assesses a weight of variable inputs.

10. The method of claim 1, wherein the survival probability of the processor module indicates a likelihood of survival of the processor module over a second time period.

11. The method of claim 1, the method further comprising outputting the survival probability of the processor module.

12. The method of claim 1, the method further comprising generating a work order to replace the processor module based at least in part on the survival probability for the processor module being below a first threshold value.

13. A method comprising:
    installing a plurality of processor modules in respective installation locations of one of a set of host vehicles;
    receiving a component history for the processor module, the component history comprising host vehicle identifies for the host vehicles in the set of host vehicles in which the plurality of processor modules were installed on the set of host vehicles;
    receiving an operational history for the set of host vehicles;
    receiving indirect sensor measurements related to the set of host vehicles;
    receiving a part status for the plurality of processor modules, the part status indicating whether the processor modules in the plurality of processor modules are in one of an operational status and a failed status;
    generating a part survival model for the plurality of processor modules based at least in part on the component history, the operational history, the indirect sensor measurements, and the part status;
    determining a survival probability for the processor modules that have the operational status based at least in part on the component history, the operational history, the indirect sensor measurements, and the part survival model;
    removing one of the processor modules from one of the installation locations and
    re-installing that one of the processor modules in a different one of the installation locations based on the survival probability.

14. The method of claim 13, the method further comprising generating an operational processor module survivability report based on the survival probability, the operational processor module survivability report indicating the processor modules in the plurality of processor modules least likely to survive during a second time period.

15. The method of claim 14, the method further comprising selecting one of the processor modules in the plurality of processor modules for replacement based at least in part on the operational processor module survivability report.

16. The method of claim 14, the method further comprising determining a quantity of replacement processor modules to procure based at least in part on the operational processor module survivability report.

17. A processor module failure assessment (PMFA) system comprising:
 a component history module configured to receive a component history for a processor module, the component history comprising an identity of an aircraft in which the processor module was installed on the aircraft;
 a data processor configured to receive:
  an operational history for the aircraft for a time period the processor module was installed on the aircraft; and
  indirect sensor measurements related to the aircraft for the time period; and
 a processor module survivability module configured to:
  receive a part survival model that is based at least in part on a part status of a plurality of historical processor modules, each of the historical processor modules having a historical component history, a historical operational history, and historical indirect sensor measurements; and
  determine a survival probability of the processor module based at least in part on the component history, the operational history, the indirect sensor measurements, and the part survival model;
 wherein the processor module is re-tasked based on results of the survival probability.

18. The system of claim 17, wherein the component history module receives component history data from both an aircraft original configuration database and a processor-module installation and removal database.

19. The system of claim 17, wherein the data processor receives the operational history from an aircraft utilization database comprising flight log data.

20. The system of claim 17, wherein the component history comprises an airline identity and a location the processor module is installed on the aircraft, the operational history comprises a number of flight cycles and a ground time during the time period, and the indirect sensor measurements comprise an outside temperature and an airflow rate for the aircraft in which the processor module was installed.

* * * * *

UNITED STATES PATENT AND TRADEMARK OFFICE
CERTIFICATE OF CORRECTION

PATENT NO. : 11,661,211 B2
APPLICATION NO. : 16/706125
DATED : May 30, 2023
INVENTOR(S) : Shervin Beygi et al.

It is certified that error appears in the above-identified patent and that said Letters Patent is hereby corrected as shown below:

In the Claims

Claim 1, Column 13, Line 32: "hos" should read --host--;
Claim 1, Column 13, Line 35: "operation" should read --operational--;
Claim 1, Column 13, Line 38: "measurement" should read --measurements--;
Claim 1, Column 13, Line 44: "operation" should read --operational--;
Claim 1, Column 13, Line 47: "of" should read --on--;
Claim 1, Column 13, Line 48: "measurement" should read --measurements--;
Claim 13, Column 14, Line 29: "module" should read --modules--;
Claim 13, Column 14, Line 30-31: "identifies" should read --identities--.

Signed and Sealed this
Second Day of April, 2024

Katherine Kelly Vidal
Director of the United States Patent and Trademark Office